March 25, 1969   W. A. BEDFORD, JR   3,434,520
DISHED WASHER LOCK FOR THREADED ELEMENT
Filed Feb. 14, 1967
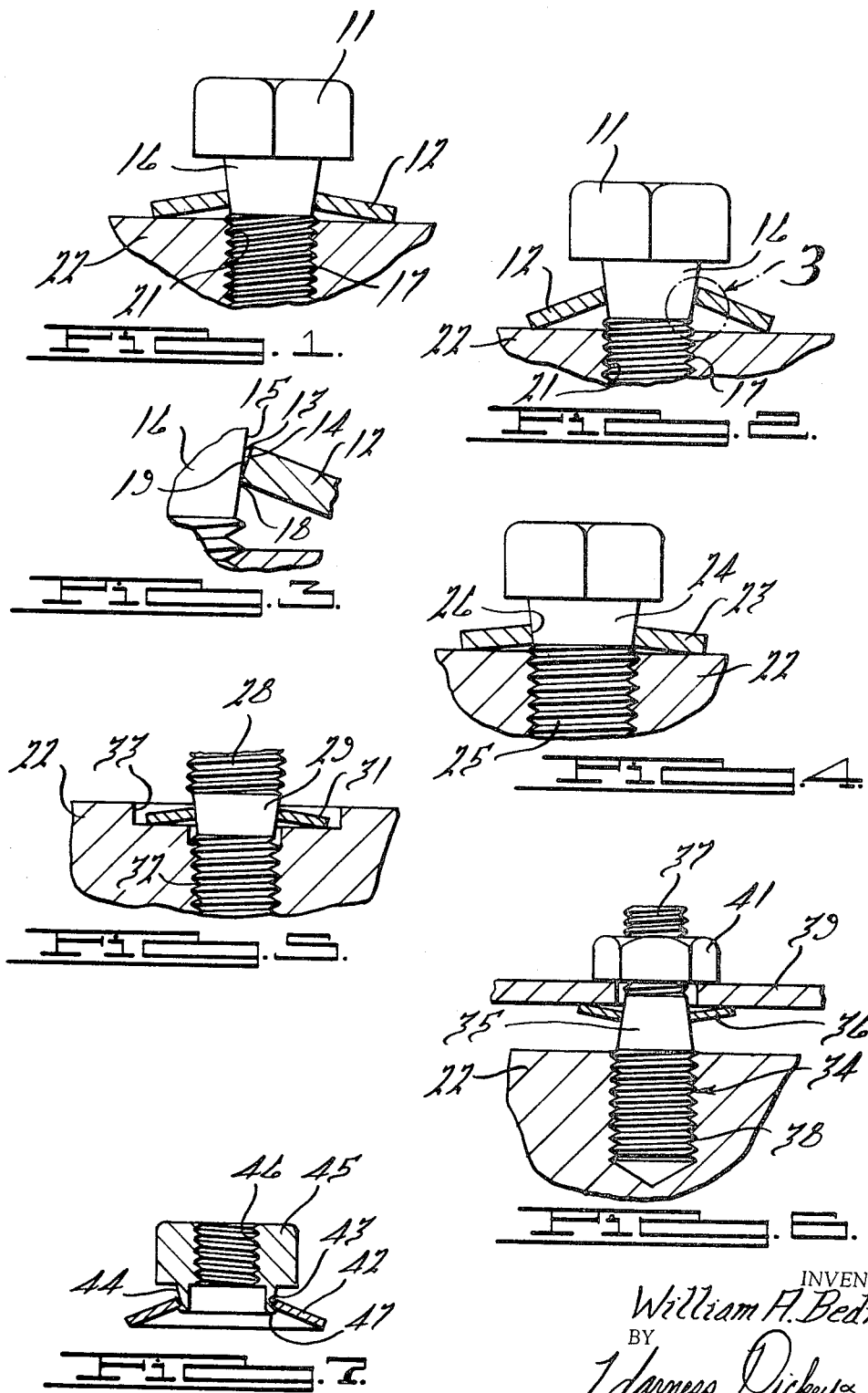
INVENTOR.
William A. Bedford, Jr.
BY
Harness, Dickey & Pierce
ATTORNEYS

3,434,520
Patented Mar. 25, 1969

3,434,520
DISHED WASHER LOCK FOR
THREADED ELEMENT
William A. Bedford, Jr., Cape Coral, Fla., assignor to Vare Corporation, New York, N.Y., a corporation of New York
Filed Feb. 14, 1967, Ser. No. 616,014
Int. Cl. F16b 39/24
U.S. Cl. 151—38            10 Claims

ABSTRACT OF THE DISCLOSURE

A dished washer has a truncated conical aperture of greater angularity than a truncated conical section on a threaded element which is engaged by the deflected face of the aperture when the washer is forced against a member with which the element is threadably engaged.

---

Difficulty has always been experienced when employing a lock washer under the head of a bolt, screw or like threaded elements which may have been weakened during the heading operation and therefore cannot withstand the substantial force of a locking washer. This also is true of the Belleville type of washer when applied to a bolt, screw and the like as it can build up an excessive force on the underside of the head. When sufficient tension is applied to the head of the bolt or the like, the head may snap off or the washer may flatten so that the holding force is eliminated or substantially reduced.

The present invention provides a positive holding force when applied to any type of threaded element such as nuts, bolts, screws, studs and the like. These elements have a truncated conical section on the body, the major diameter of which is greater than the minor diameter of the aperture of the dished washer which cannot be removed from the large end of the section. With such an arrangement it is impossible to flatten the washer as the force is applied radially from the conical section of the body to the peripheral edge of the washer assuring a maximum holding force.

Accordingly, an object of the invention is to provide a threaded element with a truncated conical section which is engaged by the wall of the aperture of a dished shaped washer to thereby prevent the collapse of the dished washer by having the aperture wall mate with the surface of the conical section of the element when substantial tension is applied to the element.

Another object of the invention is the provision of a dished washer with an aperture having a wall of greater slope than that of the wall of a truncated conical section on a threaded element which is to be secured thereby.

Another object is to form a dished washer by first punching an aperture therefrom in the flat and thereafter deflecting the body portion into dish-shape in such a manner that the diameter of the aperture on the dished side is less than that of the aperture on the outer side.

A further object is to provide a threaded element and dished washer combination, which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken sectional view of a threaded element and washer when in locked position;

FIG. 2 is a view of the structure illustrated in FIG. 1, before the threaded element is tightened on the washer;

FIG. 3 is an enlarged broken view of the structure illustrated in FIG. 2, as viewed within the circle 3 thereof;

FIG. 4 is a view of a structure, similar to that illustrated in FIG. 1, showing another form of the invention;

FIG. 5 is a view of structure, similar to that illustrated in FIG. 4, showing a further form of the invention;

FIG. 6 is a view of structure, similar to that illustrated in FIG. 5, showing a still further form of the invention; and FIG. 7 is another form of a threaded element having a dished washer applied thereto in a manner to practice the present invention.

Referring to FIGS. 1, 2 and 3, the novel relationship between a threaded element 11 in the nature of a screw having a head 10 and a dished washer 12 clearly illustrates the combination of the present invention. With this combination a substantial holding force is provided without subjecting the head 11 to any strain except in torsion. The metal of the head is often overworked and is weakened so that assurance cannot be had that the head could withstand the tensional strain to which it is subjected by the washer.

Referring to FIG. 3, it will be noted that the washer 12 has an aperture 13 therein the wall 14 of which slopes at a greater angle than the slope 15 of a tapered section 16 between the threaded body 17 and the head 10. The washer 12 is preferably stamped to have the aperture 13 disposed concentric to the peripheral edge in its flat state. When an operation is applied to the washer to form it into dished shape, the edge 18 of the aperture 13 on the inside of the dish is smaller in diameter than the edge 19 on the outer side thereof. It will be noted that the threaded body is of less diameter than the diameter of the edge 18 so that the dished washer 12 may be slid thereover to have the edge of the aperture 13 engage the sloping surface 15 of the conical section 16. As the thread is screwed downwardly into a threaded aperture 21 in a block 22, the washer 12 will be deflected downwardly to build up a force until the inner wall 14 of the washer 12 mates with the wall 15 of the conical section 16. Thereafter the pressure builds up very rapidly to securely lock the truncated conical portion and the washer 12 on the block 22 with a radial pressure which provides a positive holding force for the threaded body 17 without straining the head 10.

In FIG. 4, a further form of the invention is illustrated, that wherein a dished washer 23 is mated to the truncated conical section 24 of a threaded body 25, the diameter of the threads of which is greater than the aperture 26 in the washer. In other words, before the threads were rolled or otherwise provided on the shank of the screw, the washer 23 was placed thereon and in this manner the washer is captured on the element. The screw is illustrated as being secured in the block 22 with the wall 26 of the washer aperture of slightly greater slope than the slope of the truncated section 24 which is shown mated thereto and stressed to provide a maximum holding force.

In FIG. 5, a further form of the invention is illustrated that wherein a stud 28 has a truncated conical section 29 interjacent its end with a dished washer 31 retained a captive thereon being placed over the conical section before the threads were formed or otherwise provided on each side of the section. In this arrangement it will be noted that the minor diameter of the conical section 29 is slightly greater than the root diameter 32 of the thread so as to be stronger than the weakest part of the thread section. The stud is shown in clamped position by the washer 31, which is illustrated as being disposed in a recess 33 in the block 22.

In FIG. 6, a further form of a stud 34 is illustrated, that having a truncated conical section 35 for receiving a dished washer 36 which is placed thereon over a threaded section 37 of smaller diameter than the body section 38 which is screwed in an aperture of the block 22. In the view, it will be seen that a plate 39 is secured to the stud 37 by a nut 41 which applies a binding force from the outer edge of the washer 36 to the inner wall thereof when the surface of the wall mates with the surface of the conical section 35. As a result the plate 39 is securely locked on the stud 34.

In FIG. 7, a still further form of the invention is illustrated that wherein a dished washer 42 is positioned to have the wall of the aperture 43 disposed to engage a sloping truncated conical section 44 extending below the body 45 of a nut having a central threaded aperture 46. While the washer 44 may be supplied separately from the nut 45, in the drawing the small end of the truncated conical extension is reversely bent at 47 to retain the washer a captive on the nut. The nut 45 is positively locked upon the thread of an element when screwed thereon as the dished washer 42 is strained to have the inner walls 43 mate with the wall of the truncated conical section 44.

It will be noted that any type of threaded body may be provided with a truncated conical section of small angularity which is preferably slightly less than the angularity of the wall of a dished washer which is to mate therewith when a substantial clamping pressure is produced thereby when screwing one threaded body into or on another. When the washer having the wall of the aperture and the peripheral edge parallel to each other and the axis has been dished, the wall of the aperture has an acute and an obtuse relationship with the inner and outer faces of the washer. This produces a sloping face to the wall which is slightly greater than the slope of the truncated conical section, as a result of which the metal between the aperture and peripheral wall of the dish is substantially strained when the surface of the aperture and that of the truncated conical section move into mated relation. Thereafter any axial movement of the threaded body substantially increases the tension on the dished washer and on the element engaged by the outer peripheral edge thereof. Thus the radial force through the body of the washer applies an outward force longitudinal of the body which is substantial and which locks the engaged threads against retromovement.

I claim:

1. A fastener assembly comprising, a threaded element having a truncated conical section thereon, and a dished washer having a central aperture of truncated conical shape converging in the same direction as the slope of the truncated conical section of said element and of greater included angle, the wall of the aperture in said washer being matable with the conical section on said element when the radially outer periphery of said washer is engaged under pressure with a member with which said element is threadably engaged.

2. A fastener assembly in accordance with claim 1, wherein said threaded element comprises a bolt having a threaded portion at one end and a head portion at the opposite end with said conical section disposed therebetween, the major diameter of said conical section being adjacent the head of said bolt.

3. A fastener assembly in accordance with claim 2, wherein the threaded element is a headed bolt and wherein the engagement between the washer and element is spaced from the head portion of said bolt.

4. A fastener assembly in accordance with claim 2, wherein the threaded portion of said bolt has a larger major diameter than the minimum diameter of the aperture in said washer.

5. A fastener assembly as recited in claim 1, wherein the minimum diameter of the aperture in said washer is on the concave side of said washer.

6. A fastener assembly as recited in claim 1, wherein said washer is compressible to bring the entire wall of the aperture therein into engagement with the conical section of said element.

7. A fastener assembly as recited in claim 1, wherein said element is in the nature of a stud having threaded sections at each end thereof and the truncated conical section is disposed therebetween.

8. A fastener assembly as recited in claim 7, wherein at least one of the threaded sections has a greater major diameter than the minimum diameter of the aperture in said washer.

9. A fastener assembly as recited in claim 1, wherein said element comprises a nut having an internally threaded aperture therein and said truncated conical section extends therefrom in coaxial relation.

10. A fastener assembly as recited in claim 9, wherein the minor diameter of the truncated conical section is flanged radially outwardly to a diameter greater than the minimum diameter of the aperture in said washer for retaining said washer on said nut.

References Cited

UNITED STATES PATENTS

| | | | |
|---|---|---|---|
| 1,945,005 | 1/1934 | Vacher | 151—38 |
| 1,961,470 | 6/1934 | Winchester | 151—38 |
| 2,681,678 | 6/1954 | Hage | 151—38 |
| 3,037,221 | 6/1962 | Lanius | 151—37 |
| 3,153,971 | 10/1964 | Lovisek | 151—38 |

FOREIGN PATENTS 521,081  1/1956  Canada.

EDWARD ALLEN, *Primary Examiner.*